United States Patent
Pautis (10) Patent No.: US 10,358,226 B2
(45) Date of Patent: Jul. 23, 2019

(54) ASSEMBLY FOR AN AIRCRAFT INCLUDING A FITTING SECURED TO THE UPPER SURFACE OF A WING BOX, FOR MOUNTING AN ENGINE STRUT TO SAID WING BOX

(71) Applicant: AIRBUS OPERATIONS (S.A.S.), Toulouse (FR)

(72) Inventor: Olivier Pautis, Merville (FR)

(73) Assignee: Airbus Operations (S.A.S.), Toulouse (FR)

(*) Notice: Subject to any disclaimer, the term of this patent is extended or adjusted under 35 U.S.C. 154(b) by 298 days.

(21) Appl. No.: 15/146,686

(22) Filed: May 4, 2016

(65) Prior Publication Data

US 2016/0244174 A1    Aug. 25, 2016

Related U.S. Application Data

(63) Continuation of application No. PCT/FR2014/052815, filed on Nov. 5, 2014.

(30) Foreign Application Priority Data

Nov. 5, 2013 (FR) ..................... 13 60821

(51) Int. Cl.
*B64D 27/26* (2006.01)
*B64D 27/18* (2006.01)

(52) U.S. Cl.
CPC ............ *B64D 27/26* (2013.01); *B64D 27/18* (2013.01); *B64D 2027/264* (2013.01)

(58) Field of Classification Search
CPC .... B64D 27/26; B64D 27/18; B64D 2027/264
See application file for complete search history.

(56) References Cited

U.S. PATENT DOCUMENTS

| 3,848,832 A * | 11/1974 | Stanley | B64D 27/18 |
| | | | 244/54 |
| 3,948,469 A * | 4/1976 | Brown | B64D 27/18 |
| | | | 244/54 |
| 4,055,041 A * | 10/1977 | Adamson | B64D 27/18 |
| | | | 244/53 A |

(Continued)

FOREIGN PATENT DOCUMENTS

| EP | 0 115 914 A1 | 8/1984 |
| EP | 0 429 100 A1 | 5/1991 |
| WO | WO 2011/012821 A2 | 2/2011 |

OTHER PUBLICATIONS

Preliminary French Search Report for Application No. 1360821 dated Jun. 11, 2014.

(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

In order to bring a turbofan engine closer to the lower surface of a wing box, the disclosure herein foresees an assembly for an aircraft including a mount for mounting a rigid structure of an engine strut to the wing box, the mount including an upper wing mount including a fitting secured to the upper surface of the wing box.

12 Claims, 4 Drawing Sheets

(56) References Cited

U.S. PATENT DOCUMENTS

| | | | | |
|---|---|---|---|---|
| 5,524,847 A * | 6/1996 | Brodell | ............... | B64C 7/02 |
| | | | | 244/54 |
| 7,780,113 B1 * | 8/2010 | Lafont | ............... | B64D 27/18 |
| | | | | 244/54 |
| 8,042,342 B2 * | 10/2011 | Diochon | ............... | B64D 27/26 |
| | | | | 244/54 |
| 8,613,405 B2 | 12/2013 | Lafont | | |
| 2005/0082423 A1 * | 4/2005 | Whitmer | ............... | B64D 27/18 |
| | | | | 244/54 |
| 2014/0174056 A1 * | 6/2014 | Suciu | ............... | B64D 27/26 |
| | | | | 60/226.1 |

OTHER PUBLICATIONS

International Search Report for Application No. PCT/FR2014/052815 dated Jul. 13, 2015.

English Translation of the Written Opinion for Application No. PCT/FR2014/052815, available online dated Mar. 1, 2016.

* cited by examiner

ASSEMBLY FOR AN AIRCRAFT INCLUDING A FITTING SECURED TO THE UPPER SURFACE OF A WING BOX, FOR MOUNTING AN ENGINE STRUT TO SAID WING BOX

CROSS-REFERENCE TO RELATED APPLICATIONS

This application is a continuation of and claims priority to PCT/FR2014/052815 filed Nov. 5, 2014, which claims the benefit of and priority to French Patent Application No. FR 13 60821, filed Nov. 5, 2013, the entire disclosures of which are incorporated by reference herein.

TECHNICAL FIELD

The present disclosure relates to the field of assemblies for aircraft including a wing element, a turbofan engine and an engine strut, the latter intended to be arranged partly below the wing element.

The disclosure herein also relates to an aircraft equipped with such an assembly. It preferably applies to commercial aircraft.

BACKGROUND

On existing aircraft, turbofan engines such as turbo-jet engines are suspended below the wing by complex mounting devices, also known as "EMSs" (Engine Mounting Structures), or even engine strut. The mounting devices commonly used have a rigid structure forming a box, i.e. formed by the assembly of lower and upper and spars interconnected by a plurality of transversal ribs located inside the box. The spars are arranged in lower and upper faces, whereas the sidewall panels close the lateral faces of the box.

In a known manner, the rigid structure of these struts, also referred to as the primary structure, is designed to allow static and dynamic forces generated by engines to be transmitted to the wing, such as the weight, thrust, or the various dynamic forces.

In this regard, in the engine struts known from the prior art, the transmission of forces between the latter and the wing is conventionally ensured by a set of mounts including a forward mount, a rear mount and an intermediate mount, notably designed to transmit the thrust loads generated by the engine.

To do this, the intermediate mount designed to transmit the thrust loads, also known as "spigot" mount, is generally implemented by a ball joint secured in the rear upper spar of the rigid structure, between the forward mount and the rear mount. This spigot mount also comprises a shaft or a shear pin secured beneath the wing of the aircraft via a mounting fitting, so as to be housed in the ball joint. The mounting fitting is generally secured to a lower portion of the wing box, usually the lower wing box spar.

On recent turbofan engines, the high bypass ratio sought leads to extremely high congestion, as an increase in the bypass ratio inevitably results in an increase in the diameter of the engine, and more particularly an increase in the diameter of its fan casing.

Also, with a ground clearance established so as to remain acceptable from a safety point of view, the space remaining between the wing element and the engine is becoming increasingly restricted, even nonexistent for engines with high bypass ratio engines. Therefore, it may be difficult to implement the engine strut and the various wing mounts in this remaining vertical space, usually dedicated to this location.

The development of turbofan engines has thus had the unfortunate consequence of imposing a reduction in the vertical dimensions of the engine strut, notably so as to maintain sufficient space to place the mounting fitting of the intermediate mount, whose main dimensions are imposed by the need to transmit thrust loads of the engine, i.e. loads oriented in the longitudinal direction of this turbo-engine, as well as those oriented in the transversal direction thereof. As an indication, it is recalled that the longitudinal direction of the turbo-engine corresponds to the direction of the main axis of rotation of the propulsion system.

However, the possibilities of reducing the vertical dimensions of the engine strut are limited. The rigid structure of this strut, also referred to as the primary structure, must be of sufficient dimensions to have the mechanical strength capable of withstanding the transmission of forces from the engine to the wing element, with low deformation under load so as not to degrade the aerodynamic performance of the propulsion system.

In the prior art, numerous solutions have been proposed to bring the engine closer to the wing element to which it is suspended, and in order to maintain the required ground clearance. However, as the diameters of the fan casings are increasingly large in order to meet bypass ratio requirements, these solutions must be further optimized.

SUMMARY

The purpose of the disclosure herein is thus to propose an assembly for an aircraft at least partially overcoming the above mentioned problems encountered in the solutions of the prior art.

To do this, the disclosure herein relates to an assembly for an aircraft including a wing element, a turbofan engine and an engine strut, the engine including a rear portion arranged below the wing element, the wing element having a wing box formed by a front spar and an upper surface of the wing element, the assembly further including a mount for mounting a rigid structure of the engine strut to the wing box.

According to the disclosure herein, the mount includes an upper wing mount comprising a fitting secured on the upper surface of the wing box. Furthermore, the rigid structure of the engine strut has a rear end at least partially embedded in a leading edge of the wing element, the rear end being located forward of the front spar of the wing box. In other words, the rigid structure extends entirely forward of the front spar of the wing box, thereby bringing the engine closer to the wing element.

Also, regarding the mounting engines located partly below the wing element, the disclosure herein breaks with existing technology designed to secure the wing mounts to the front wing box spar and/or its lower surface. On the contrary, by securing the upper wing mount to the upper surface of the wing box, the space below the wing element is freed up and thus allows the engine to be moved closer to this wing element, below its lower surface.

The disclosure herein has one or more of the following optional characteristics.

The rigid structure of the engine strut has at least a cross section of height greater than the height of the front wing box spar.

The rigid structure of the engine strut is located entirely above a low point of the wing element.

The rigid structure of the engine strut has a front end secured to an outer ferrule of an intermediate casing of the engine, the outer ferrule extending in continuation of a fan casing.

The engine is arranged so as to circulate a portion of a secondary airflow, from a secondary duct of the engine, above the wing element.

The mount of the rigid structure consists of or comprises several wing mounts forming an isostatic load transfer system.

The upper wing mount is designed to accommodate thrust loads oriented in a longitudinal direction of the engine, and preferably comprises a connecting rod articulated on the fitting and oriented in the longitudinal direction.

The mount also comprises two lower wing mounts offset transversely from each other, each of the two lower wing mounts being designed to at least transfer the thrust loads oriented in the longitudinal direction.

Each of the two lower wing mounts has a fitting secured to the front spar of the wing box. Preferably, a portion of this fitting is secured to or near a lower end of the front spar of the wing box.

It may, for example, be either a fitting with a single-face flange secured to the front spar of the wing box, or a fitting with a so-called "corner fitting" type double-face flange, secured to the front spar and to the lower surface of the wing box.

The mount of the rigid structure consists of or comprises the following wing mounts:
  the upper wing mount, designed to transfer only thrust loads oriented in a longitudinal direction of the engine;
  two lower wing mounts offset transversely from one another, and each designed to transfer only thrust loads oriented in the longitudinal direction and in a vertical direction of the engine; and
  a lateral wing mount, designed to transfer only forces oriented in a transversal direction of the engine.

In this case, the lateral wing mount preferably comprises a connecting rod articulated at both ends on two fittings secured to a sidewall panel of the rigid structure of the engine strut, and to the front spar of the wing box, respectively.

Alternatively, the mount of the rigid structure consists of or comprises the following wing mounts:
  the upper wing mount, designed to transfer only thrust loads oriented in a longitudinal direction of the engine and in a transversal direction thereof; and
  two lower wing mounts offset transversely from one another, and each designed to transfer only thrust loads oriented in the longitudinal direction and in a vertical direction of the engine.

Regardless of the solution adopted for the design of the wing mounts, the rigid structure preferably takes the shape of a wing box.

Finally, the disclosure herein also relates to an aircraft including at least one assembly such as that described above.

Other advantages and features will become more clearly apparent from the non-limiting detailed description which follows.

BRIEF DESCRIPTION OF THE DRAWINGS

This description will be made with reference to the accompanying drawings among which.

DETAILED DESCRIPTION

Figure 1:
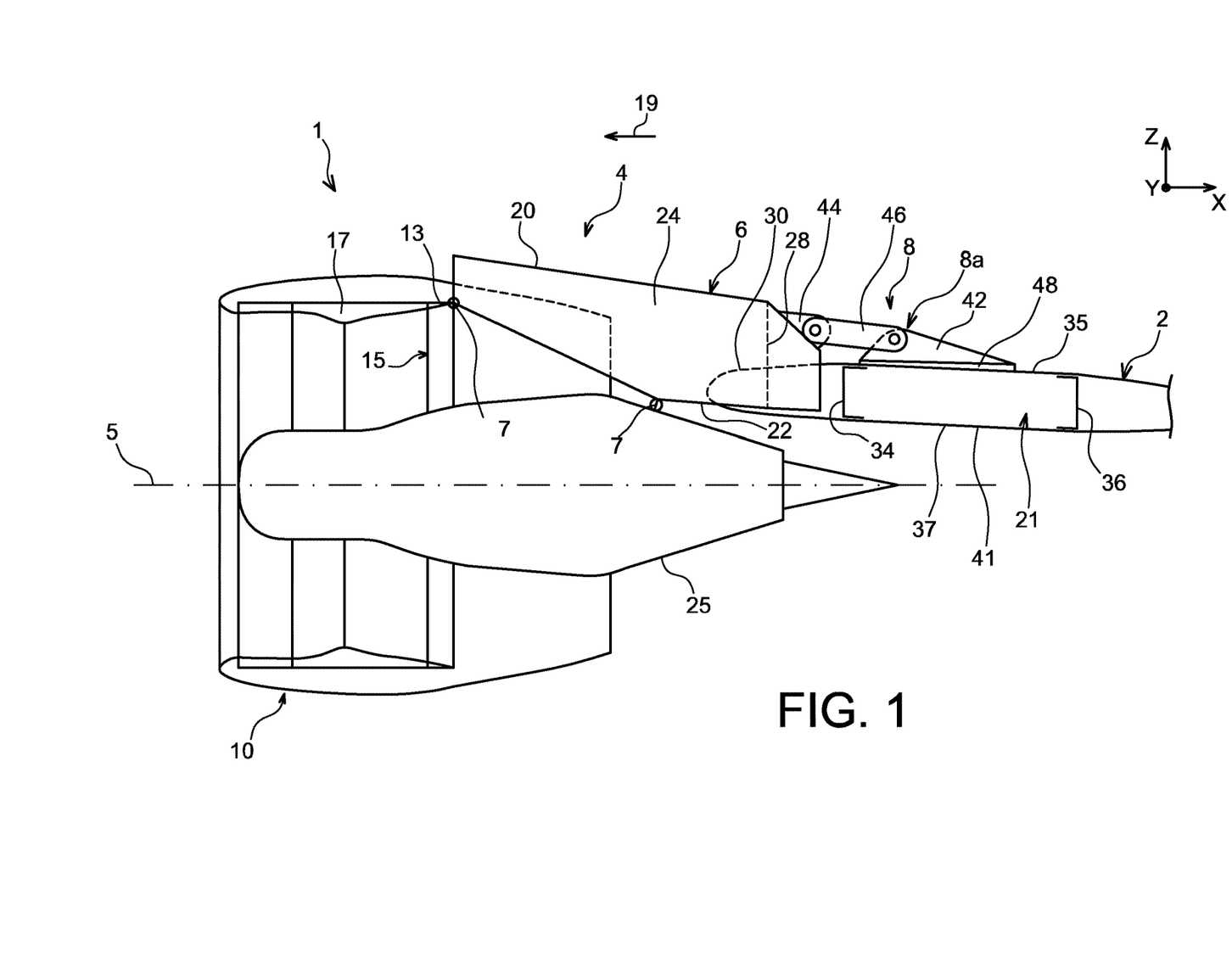
FIG. 1 represents a schematic side view of an assembly for an aircraft according to a first preferred embodiment of the present disclosure.

In reference to FIG. 1, an assembly 1 for an aircraft is represented according to a first preferred embodiment of the present disclosure.

Overall, this assembly 1 comprises a wing element 2 corresponding to a wing of the aircraft, a turbofan engine 10 such as a turbo-jet engine, and an engine strut 4 for the engine 10. Furthermore, the assembly 1 comprises a mount 7 for mounting the turbo-jet engine 2 to a rigid structure 6 of the strut 4, as well as a mount 8 for mounting the rigid structure 6 to the wing element 2.

It should be noted that the mount 7, located at the interface between the strut 4 and the turbo-jet engine 10, are produced in a conventional manner. They have therefore only been represented here in a schematic manner in FIG. 1. In this regard, the front end of the rigid structure 6, also referred to as the primary structure, is secured, via a suitable fitting, to an outer ferrule 13 of an intermediate casing 15 of the turbo-jet engine 10. This ferrule 13 extends rearwardly in the axial extension of a fan casing 17, substantially with the same diameter.

Throughout the description that follows, the X direction conventionally corresponds to the longitudinal direction of the strut 4, which is also comparable with the longitudinal direction of the turbo-jet engine 10. This X direction is parallel to a longitudinal axis 5 of this turbo-jet engine 2. Furthermore, the Y direction corresponds to the direction oriented transversely in relation to the strut 4 and is also comparable to the transversal direction of the turbo-jet engine 10, whereas the Z direction corresponds to the vertical direction or the height. These three directions X, Y and Z are mutually orthogonal and form a direct trihedral.

Furthermore, the terms "front" and "rear" are to be considered with respect to a direction of travel of the aircraft encountered subsequent to the thrust exerted by the turbo-jet engines 10, this direction being schematically represented by the arrow 19.

The wing 2 comprises a wing box 21, designed to form the structural part of the wing. This wing box is bounded at the front by a front spar 34 of the wing element 2, and bounded at the rear by a rear spar 36. The two spars 34, 36, which extend substantially over the full thickness of the wing, are oriented in a conventional manner along the wingspan direction. In addition, the wing box 21 is closed upwardly by the upper surface 35 of the wing, and closed downwardly by the lower surface 37 of this same wing. The two side rails 34, 36 are attached internally to the upper and lower surfaces 35, 37 which form the aerodynamic surfaces of the wing.

Again in reference to FIG. 1, it is indicated that only the rigid structure forming a box 6 of the engine strut 4 has been represented, together with a part of the mount 8 for mounting this rigid structure to the wing element 2. The other non-represented constituent, secondary structural type elements of this strut 4, ensuring the segregation and support of systems while supporting aerodynamic fairings, are conventional elements that are identical or similar to those encountered in the prior art. Consequently, no detailed description shall be provided.

The rigid structure 6 is actually of "box" type, i.e. formed by the assembly of upper spars 20 and lower spars 22 and two sidewall panels 24 (only one being visible owing to the side view), these elements 20, 22, 24 being interconnected by inner transversal ribs (not shown), which are usually oriented in parallel planes YZ. These ribs are preferably evenly distributed within the box 6, in the X direction.

Moreover, at the rear of the rigid structure 6, it has a rear closure element 28 equally taking the shape of a former, i.e. a plate-like member fully closing the box, or a frame-shaped rib, i.e. having an opening in its middle and thus only partially closing this same box. This element 28 is preferably substantially vertically oriented and rigidly connected to each of the elements 20, 22, 24 of the box 6.

The sidewall panels 24 may extend rearwardly beyond the rear closure element 28, as represented in FIG. 1. Furthermore, one of the features lies in the fact that the rear end of the rigid structure 6, formed by the element 28 and the projecting portions of the panels 24, is located forward of the front spar 34. Also, the entire rigid structure 6 extends forward of this front spar 34, with at least a portion of its rear end embedded in the leading edge 30 of the wing 2, this leading edge being defined towards the front starting from the spar 34. Here, the entire rigid structure 6 is located above a low point of the wing, this low point being identified schematically by reference 41 in FIG. 1. Consequently, the rigid structure 6 is shifted forward and upward in relation to the embodiments known in the prior art, which allows the turbo-jet engine 10 to be brought closer to the lower surface 37. In this regard, it should be noted that a rear portion of the turbo-jet engine 10 is mounted below the wing 2, in particular all or part of the turbine casing 25 and the elements located at the rear of this casing. More generally, it is a part of the casing referred to as the "core" casing of the turbo-jet engine.

By bringing the turbo-jet engine 10 closer to the lower surface 37, it is possible to consider turbo-jet designs with a high bypass ratio consequently having a large fan diameter, while maintaining the required ground clearance. In addition, reducing the distance contributes to limiting the lever arm between the turbo-jet engine and the wing, and therefore participates in limiting induced parasitic bending moments. Also, the weight and the cost of this rigid structure are advantageously reduced. Finally, by shifting the box 6 forward of the wing box spar 34, and not inserting it in the vertical Z direction between this box and the turbo-jet engine 10, the aerodynamic disturbances below the wing are limited.

The rigid structure 6 is also of compact design, much less elongated than previously encountered. In particular, the rigid structure 6 comprises at least one cross section with height greater than the height of the front spar 34 of the wing box 21. This relationship between the height of the transversal cross section of the box 6 and the height of the spar 34 is preferably verified on a very large portion of the box, for example over the entire length of this box 6, except possibly its front end. For example, at the rear extremity of the box opposite the front spar 34, the closure element 28 has a height between 1.5 and 2.5 times the height of the spar 34.

Preferably, the ratio between the maximum length of the box 6 in the X direction, and the average height of the box 6 in the Z direction, is between 1.5 and 3.5. This compactness offers enhanced mechanical behavior, enabling the transfer of forces from the turbo-jet engine 10 towards the wing 2. It should also be noted that this compactness, made possible by increasing the height of the box 6, does not penalize the ground clearance, as this same box 6 is not inserted vertically between the wing and the engine, but arranged generally forward of the wing.

Figure 2:
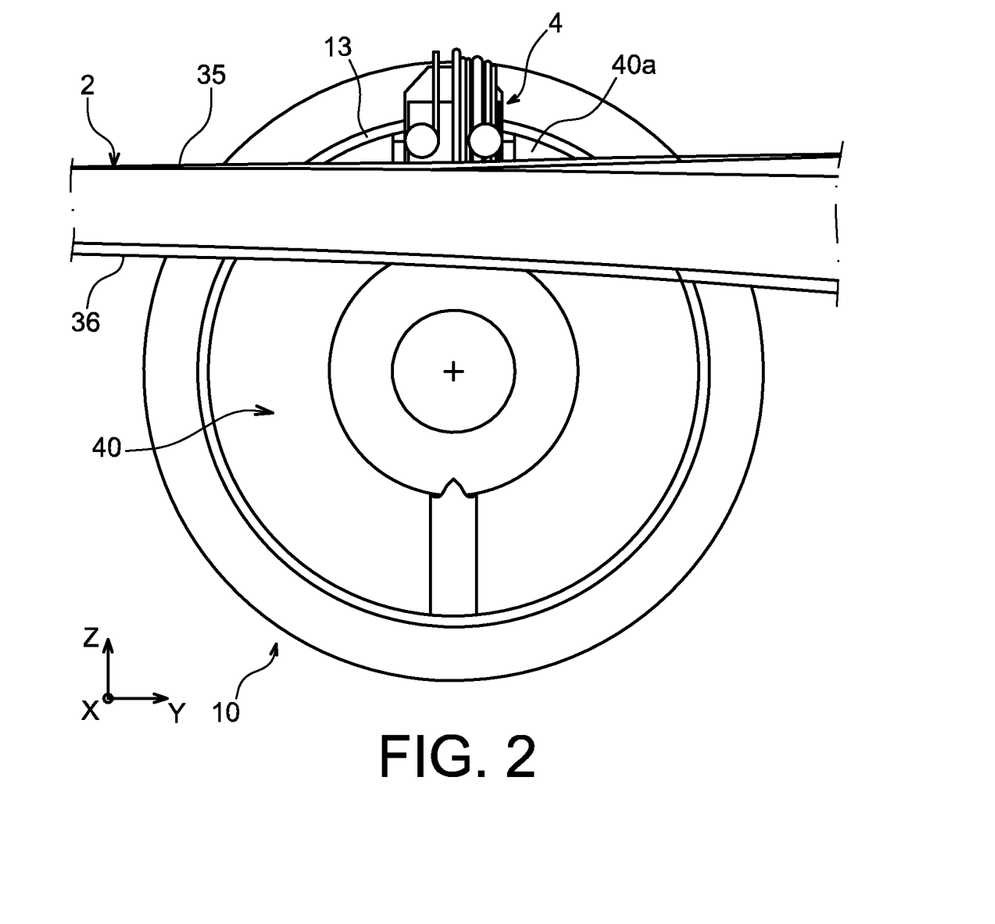
FIG. 2 represents a rear view of the assembly shown in FIG. 1.

This also results in an overall elevation of the strut 4 and the turbo-jet engine 10 in relation to the wing 2, as can be seen in FIG. 2. More precisely, a secondary duct 40 of the turbo-jet engine is represented, wherein a secondary airflow is intended to circulate. An upper part 40a of the duct 40 is higher than the wing 4, so that a corresponding portion of the secondary airflow circulates above this wing, after exiting the intermediate casing. More conventionally, the other part of the duct 40 is lower than the wing 4, so that a corresponding portion of the secondary airflow flows below this wing.

Figure 3:
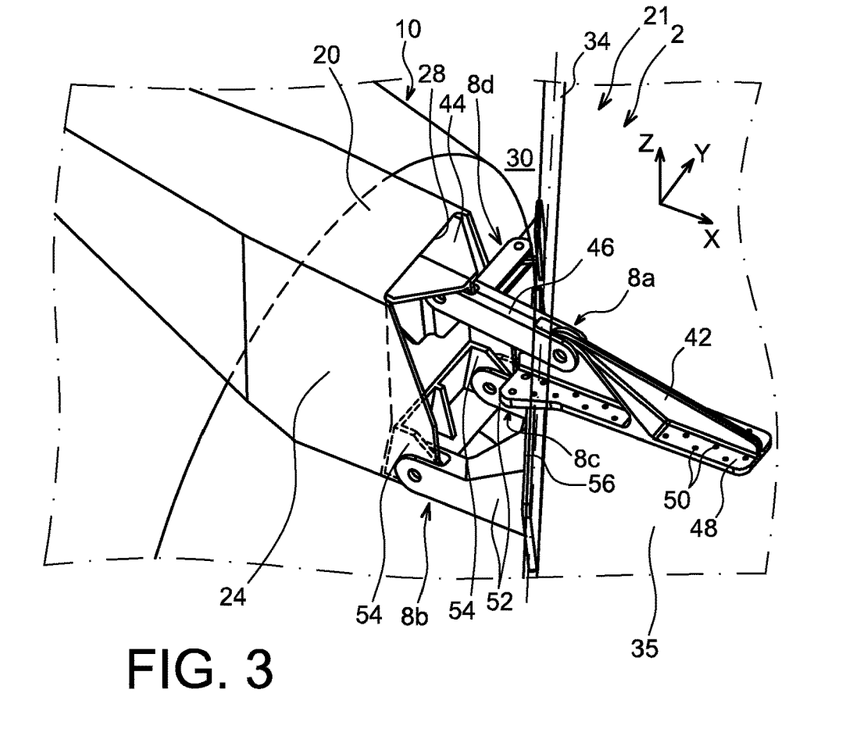
FIG. 3 represents a partial perspective view of the assembly shown in FIGS. 1 and 2.
Figure 4:
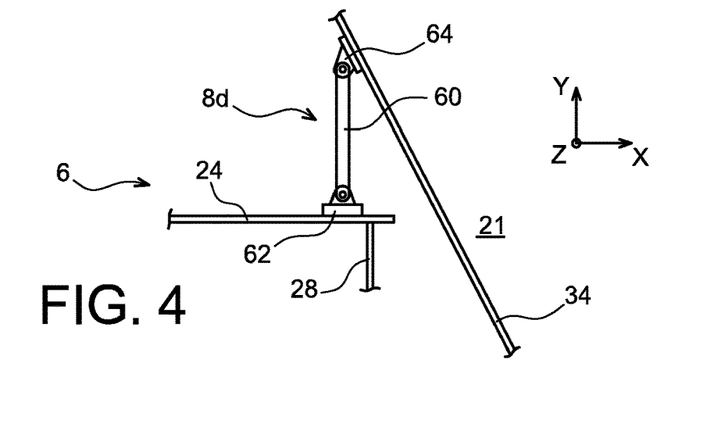
FIG. 4 represents a top view of a portion of the assembly of FIG. 3, showing more specifically the lateral wing mount.

In reference to FIGS. 1, 3 and 4, the mount 8 consists of or comprises several wing mounts that together form an isostatic load transfer system. In this first preferred embodiment, there are four wing mounts, referenced 8a, 8b, 8c, and 8d, respectively.

Firstly, this is an upper wind mount 8a, which is designed to transfer only the thrust loads oriented in the X direction. One of the features of the disclosure herein lies in the fact that the mount 8a comprises a fitting 42 secured externally on the upper surface 35 of the wing box 21. Another fitting 44 is secured opposite the fitting 42, on the closure element 28 of the box 6. The two fittings 42, 44 are connected to each other by a connecting rod 46 oriented substantially in the X direction. The connecting rod 46 is articulated at both ends, on the fittings 42, 44, respectively. The hinge pins are thus preferably oriented in the Y direction and cooperate with clevises provided at the fittings 42, 44, or the connecting rod 46. Each of the aforementioned elements 42, 44, 46 may be doubled so as to ensure the transmission of forces even in the event of failure of any one of these elements. This design makes it possible to offer a "Fail-Safe" safety function.

Providing an upper wing mount, which is generally arranged above the wing box 21, frees the space below the latter, and therefore allows the turbo-jet engine to be moved closer to the lower surface of the wing 2. This arrangement thus greatly improves the possibilities for installing turbo-jet engines with a high bypass ratio while maintaining the required ground clearance.

The fitting 42 is fastened to the upper surface 35 by a flange 48 which extends longitudinally, and which is rigidly connected to this same upper surface 35 by fastening elements 50. These fastening elements 50, which thus also pass through the upper surface 35, are thus loaded in shear the moment thrust loads are introduced in the wing box 21. These are preferably bolts or similar elements, arranged substantially along the Z direction, and/or arranged orthogonally to the flange 50 and upper surface 35, locally.

The mount 8 also comprises two lower wing mounts 8b, 8c, offset from each other in the Y direction. Both mounts 8b, 8c are designed to only transfer forces oriented in the X and Z directions, the forces transferred in this latter direction Z being essentially associated with the actual weight of the engine. To do this, each mount 8b, 8c has a fitting 52 secured to the front spar 34 by a bolted flange 56. In this regard, it is indicated that the fitting 52 comprises either the single-face flange 56 secured to the front wing box spar, or a so-called "corner fitting" type double-face flange, secured to both in the front wing box spar 34 and to the lower surface 37 of the box.

Furthermore, a corresponding fitting 54 is secured to the lower surface of the closure element 28 of the box 6. Each pair of fittings 52, 54 is connected by a hinge pin oriented in the Y direction. To do this, one of the fittings 52, 54 has a yoke-shaped end, whereas the other has an end inserted between the two heads of the yoke. As shown in FIG. 3, the two fittings 52, 52 may be formed from a single piece, as the two fittings 54, 54. The flange 56 extends over a large part of the height of the front spar 34, and has a portion secured to a lower end of this same spar. This helps spread the lower mounts 8b, 8c from the upper mount 8a as much as possible, in the Z direction, without taking up space below the wing 2. The transfer of the moment in the Y direction may thus be more effective by loading the wing box 21 in shear over substantially its entire section.

Finally, referring more specifically to FIG. 4, the mount 8 comprises a lateral wing mount 8d designed only to transfer forces oriented in the Y direction. To do this, the lateral wing mount 8d comprises a connecting rod 60 oriented in the Y direction, and articulated at both ends on two fittings 62, 64 secured to one of the sidewall panels 24 of the box and on the front spar 34, respectively. The panel 24 concerned is the one closest to the front spar 34, i.e. the one closest to the fuselage of the aircraft.

It should be noted that all of mount 8 is preferably located above the lower surface of the wing box 21, given that no wing mount extends lower than the lower end of the front spar 34 of the wing box 21. The upper mount 8a is located above the wing 2, whereas the other mounts 8b, 8c, 8d are partly housed in the leading edge 30, without extending below the latter.

With this isostatic arrangement, the thrust loads oriented in the X direction are transferred by the upper wing mount 8a and the two lower wing mounts 8b, 8c. The forces oriented in the Y direction are transferred by the lateral wing mount 8d, whereas the forces oriented in the Z direction are transferred by the two lower wing mounts 8b, 8c.

Furthermore, the moment in the X direction is transferred by the two lower wing mounts 8b, 8c, taking up vertical force, and the moment in the Z direction is also transferred by these two lower wing mounts 8b, 8c, taking up longitudinal forces. Finally, the moment in the Y direction is transferred on the one hand by the upper wing mount 8a and on the other hand by the two lower wing mounts 8b, 8c, each taking up longitudinal forces. Owing to the specific location of these mounts 8a, 8b, 8c arranged in the Z direction at the ends of the wing box 21, moment in the Y direction is advantageously transferred in shear over the complete section of this wing box 21.

Figure 5:
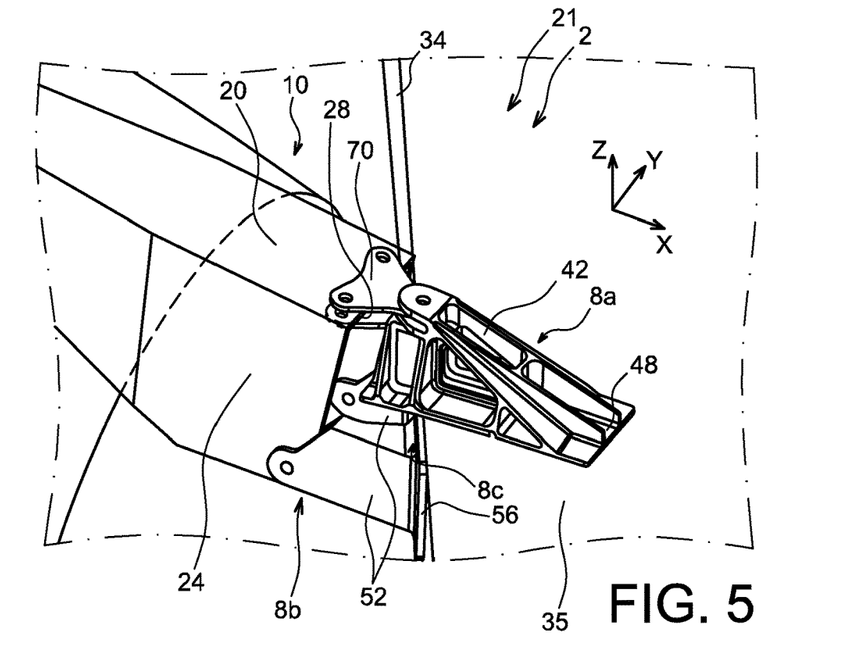
FIG. 5 represents a perspective view of an assembly for an aircraft according to a second preferred embodiment of the present disclosure.
Figure 6:
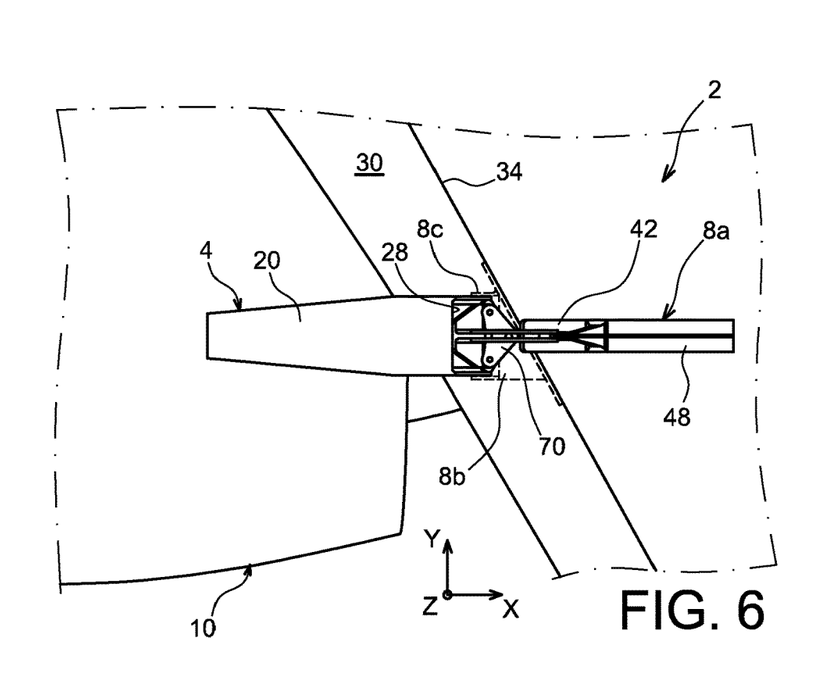
FIG. 6 represents a top view of the assembly shown in FIG. 5.

In reference to FIGS. 5 and 6, an assembly 1 is represented according to a second preferred embodiment of the disclosure herein. This second embodiment has many similarities with the first embodiment. Moreover, in FIGS. 1 to 6, the elements bearing the same numerical references correspond to identical or similar elements.

Here, only the mount 8 differs from those set forth above, since the lateral wing mount has been removed. The forces oriented in the Y direction are thus transferred by the upper wing mount 8a, which thus has an advanced design with the presence of a triangular shackle 70, the rear apex of which is hinged on the fitting 45 secured externally to the upper surface 35, and whose two other front apexes are articulated on the rigid structure 6 in the shape of a box. More specifically, these last two articulations are made on a rear end of the upper wing box spar 20, this end protruding for example from the rear closure element 28. Here, the hinge pins are preferably substantially oriented in the Z direction.

Furthermore, doubling of the triangular shackle 70 is also preferred, always for the purpose of fulfilling the "Fail-Safe" function.

With this isostatic arrangement, the thrust loads oriented in the X direction are transferred by the upper wing mount 8a and the two lower wing mounts 8b, 8c. The forces oriented in the Y direction are transferred by the upper wing mount 8a, whereas the forces oriented in the Z direction are transferred by the two lower wing mounts 8b, 8c.

Furthermore, moments are transferred in the same manner as in the first preferred embodiment described above.

Of course, those skilled in the art may make various modifications to the assemblies 1 for an aircraft which have been described solely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft including a wing element, a turbofan engine and an engine strut, the engine including a rear portion arranged below the wing element, the wing element having a wing box formed by a front spar and an upper surface of the wing element, the assembly further including a mount for mounting a rigid structure of the engine strut to the wing box,
   the mount comprising an upper wing mount comprising a fitting secured to the upper surface of the wing element, and the rigid structure of the engine strut comprising a rear end at least partially embedded in a leading edge of the wing element, the rear end being located forward of the front spar,
   wherein the mount of the rigid structure comprises wing mounts including:
   the upper wing mount to transfer only thrust loads oriented in a longitudinal direction from the engine;
   two lower wing mounts offset transversely from one another, and each configured to transfer only thrust loads oriented in the longitudinal direction and in a vertical direction from the engine; and
   a lateral wing mount to transfer only forces oriented in a transversal direction from the engine.

2. The assembly according to claim 1, wherein the rigid structure of the engine strut has at least one cross section of height greater than a height of the front spar.

3. The assembly according to claim 1, wherein the rigid structure of the engine strut is located entirely above a low point of the wing element.

4. The assembly according to claim 1, wherein the rigid structure of the engine strut has a front end secured to an outer ferrule of an intermediate casing of the engine, the outer ferrule extending in continuation of a fan casing.

5. The assembly according to claim 1, wherein the engine is arranged so as to circulate a portion of the secondary airflow of the engine above the wing element.

6. The assembly according to claim 1, wherein the mount forms an isostatic load transfer system.

7. The assembly according to claim 6, wherein the upper wing mount comprises a connecting rod articulated on the fitting and oriented in the longitudinal direction.

8. The assembly according to claim 1, wherein each of the two lower wing mounts has a fitting secured to the front spar of the wing box.

9. The assembly according to claim 1, wherein the lateral wing mount comprises a connecting rod articulated at both ends on two fittings secured to a sidewall panel of the rigid structure of the engine strut, and to the front spar of the wing box.

10. An assembly for an aircraft including a wing element, a turbofan engine and an engine strut, the engine including a rear portion arranged below the wing element, the wing element having a wing box formed by a front spar and an upper surface of the wing element, the assembly further including a mount for mounting a rigid structure of the engine strut to the wing box, the mount comprising an upper wing mount comprising a fitting secured to the upper surface of the wing element, and the rigid structure of the engine strut comprising a rear end at least partially embedded in a leading edge of the wing element, the rear end being located forward of the front spar,
wherein the mount of the rigid structure comprises wing mounts including:
the upper wing mount designed to transfer only thrust loads oriented in a longitudinal direction of the engine and in a transversal direction thereof; and
two lower wing mounts offset transversely from one another, and each designed to transfer only thrust loads oriented in the longitudinal direction and in a vertical direction from the engine.

11. The assembly according to claim 1, wherein the rigid structure is shaped as a box.

12. An aircraft including at least one assembly according to claim 1.

* * * * *